US012719310B2

(12) United States Patent
Gandhi et al.

(10) Patent No.: US 12,719,310 B2
(45) Date of Patent: Aug. 25, 2026

(54) WI-FI ASSISTED ENERGY HARVESTING OF BACKSCATTERING DEVICES

(71) Applicant: Cisco Technology, Inc., San Jose, CA (US)

(72) Inventors: Indermeet S. Gandhi, San Jose, CA (US); Robert E. Barton, Richmond (CA); Ugo M. Campiglio, Morges (CH)

(73) Assignee: Cisco Technology, Inc., San Jose, CA (US)

( * ) Notice: Subject to any disclaimer, the term of this patent is extended or adjusted under 35 U.S.C. 154(b) by 283 days.

(21) Appl. No.: 18/539,057

(22) Filed: Dec. 13, 2023

(65) Prior Publication Data

US 2024/0380242 A1 Nov. 14, 2024

Related U.S. Application Data

(60) Provisional application No. 63/501,839, filed on May 12, 2023.

(51) Int. Cl.
*H02J 50/00* (2016.01)
*H02J 50/80* (2016.01)
*H04W 74/04* (2009.01)
*H04W 84/12* (2009.01)

(52) U.S. Cl.
CPC ............ *H02J 50/001* (2020.01); *H02J 50/80* (2016.02); *H04W 74/04* (2013.01); *H04W 84/12* (2013.01)

(58) Field of Classification Search
CPC ..... H04W 74/00; H04W 74/04; H04W 84/10; H04W 84/12; H02J 50/00; H02J 50/001; H02J 50/80; H04B 1/38; H04B 1/3827; H04B 1/3838; H04B 1/385; H04B 2001/3861; H04B 5/00; H04B 5/20
See application file for complete search history.

(56) References Cited

U.S. PATENT DOCUMENTS

| | | | | |
|---|---|---|---|---|
| 9,509,151 | B2 * | 11/2016 | Lee | H02J 50/80 |
| 11,316,377 | B2 * | 4/2022 | Zeine | H02J 50/20 |
| 2019/0044392 | A1 | 2/2019 | Chowdhury et al. | |

(Continued)

FOREIGN PATENT DOCUMENTS

| | | |
|---|---|---|
| WO | 2018043841 A1 | 3/2018 |
| WO | 2022170249 A1 | 8/2022 |
| WO | 2023060536 A1 | 4/2023 |

OTHER PUBLICATIONS

International Search Report and Written Opinion for International Application No. PCT/US2024/027289, mailed Sep. 4, 2024, 13 Pages.

(Continued)

*Primary Examiner* — Quochien B Vuong
(74) *Attorney, Agent, or Firm* — Patterson + Sheridan, LLP

(57) ABSTRACT

Embodiments herein use a 5G node to provide supplemental power to an AMP STA to assist with Wi-Fi communication. Wi-Fi APs may not provide sufficient power wirelessly for the AMP STA to transmit data, or to transmit data as frequently as desired by the AMP STA. A controller can determine when an AMP STA is not receiving sufficient wireless power and provides instructions to a 5G node to provide supplemental power to the AMP STA. The AMP STA can use the power received from the 5G node to transmit Wi-Fi data to the AP.

19 Claims, 5 Drawing Sheets

(56) References Cited

U.S. PATENT DOCUMENTS

2020/0169318 A1 5/2020 Kim et al.
2020/0244297 A1 7/2020 Zalewski et al.
2022/0337084 A1 10/2022 Elshafie et al.
2023/0031981 A1 2/2023 Yehezkely et al.
2023/0119392 A1* 4/2023 Wang ........................ H04B 5/45
370/311
2023/0198641 A1 6/2023 Peddireddy et al.

OTHER PUBLICATIONS

U.S. Appl. No. 18/295,223, filed Apr. 3, 2023, 32 Pages.
U.S. Appl. No. 18/509,142, filed Nov. 14, 2023, 38 Pages.

* cited by examiner

WI-FI ASSISTED ENERGY HARVESTING OF BACKSCATTERING DEVICES

CROSS-REFERENCE TO RELATED APPLICATIONS

This application claims benefit of U.S. provisional patent application Ser. No. 63/501,839 filed May 12, 2023. The aforementioned related patent application is herein incorporated by reference in its entirety.

TECHNICAL FIELD

Embodiments presented in this disclosure generally relate to using 5G deployments to aid ambient stations (AMP STAs) to communicate with Wi-Fi access points (APs).

BACKGROUND

In the IEEE 802.11 working group, the AMP (AMbient Power) study group is considering the integration of AMP STAs into Wi-Fi networks. Generally, a system transmits energy that AMP STAs receive and use for their own transmissions. In one form, the AMP STA is entirely passive, and merely reflects (thus in real time) the energy (referred to as backscattering). In another form, the AMP STA can accumulate the energy in an energy storage component, such as a capacitor, until reaching a threshold at which transmission becomes possible (thus transmission is not concurrent to the received Wi-Fi signal, but can still happen at any time after enough energy has accumulated).

Prior solutions have attempted to leverage Wi-Fi radio as a source of energy which ambient power-based backscattering Internet of Things (IoT) devices can harvest and transmit a signal to an AP. This can include either backscattering the energy received from an AP (when the AMP STA is passive) or first storing the energy in an energy storage device before transmitting data to an AP (when the AMP STA is active).

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a system that includes an ambient station (AMP STA) configured to use a received radio frequency (RF) signal to transmit a Wi-Fi signal, a Wi-Fi access point (AP) configured to communicate with the AMP STA, and a 5G node configured to transmit an RF signal to the AMP STA where the AMP STA is configured to use power generated by the RF signal received from the 5G node to transmit the Wi-Fi signal to the AP.

Another embodiment presented in this disclosure is an AP that includes one or more processors and memory storing an application, which, when executed by the one or more processors performs an operation. The operation includes determining that an AMP STA needs additional power when communicating with the AP where the AMP STA is configured to use received RF signals to transmit a Wi-Fi signal to the AP and instructing a 5G node to provide supplemental wireless power to the AMP STA.

Another embodiment presented in this disclosure is a non-transitory computer readable storage medium comprising computer readable program code embodied therewith, the computer readable program code executable by one or more computer processors to perform an operation. The operation includes determining that an AMP STA needs additional power when communicating with an AP where the AMP STA is configured to use received RF signals to transmit a Wi-Fi signal to the AP and instructing a 5G node to provide supplemental wireless power to the AMP STA.

Example Embodiments

Embodiments herein use a 5G node (e.g., 5G gNodeBs (gNBs)) to provide supplemental power to an AMP STA to assist with Wi-Fi communication. AMP STAs can include backscattering devices (BKD) (or BKD STAs) that can store energy (e.g., in capacitors) from received RF energy and BKD devices that are purely passive and reflect RF energy without storing it. AMP STAs that can store energy are referred to as active AMP STAs while AMP STAs that can only reflect or backscatter received energy without storing it are referred to as passive AMP STAs.

However, Wi-Fi APs may not provide sufficient power wirelessly for an AMP STA to transmit data, or to transmit data as frequently as desired by the AMP STA. The AP can learn that an AMP STA is not receiving sufficient wireless power and inform a controller (e.g., Multi-Access Point Coordination (MAPc)) which then provides instructions to a 5G node to provide supplemental power to the AMP STA. The AMP STA can use the power received from the AP and the 5G node to transmit Wi-Fi data to the AP.

Figure 1:
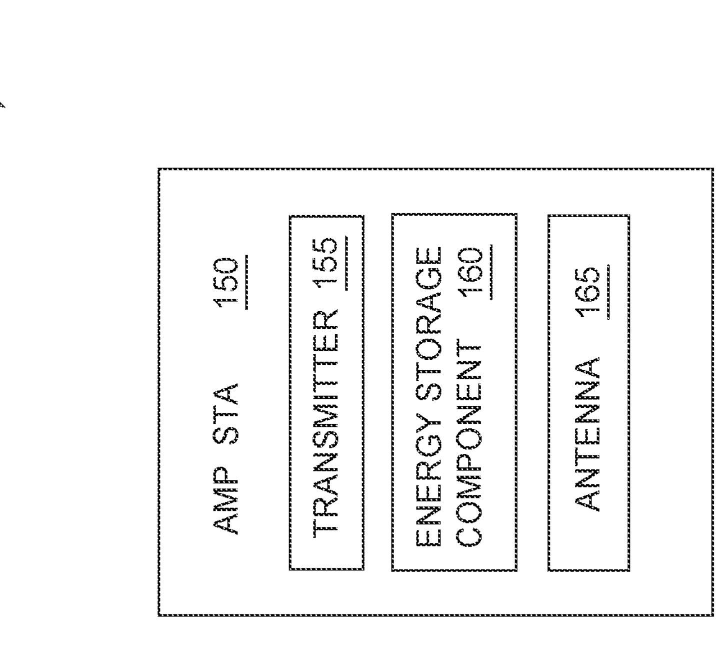
FIG. 1 illustrates a deployment with a Wi-Fi access point and a 5G node, according to one embodiment.
Figure 1:
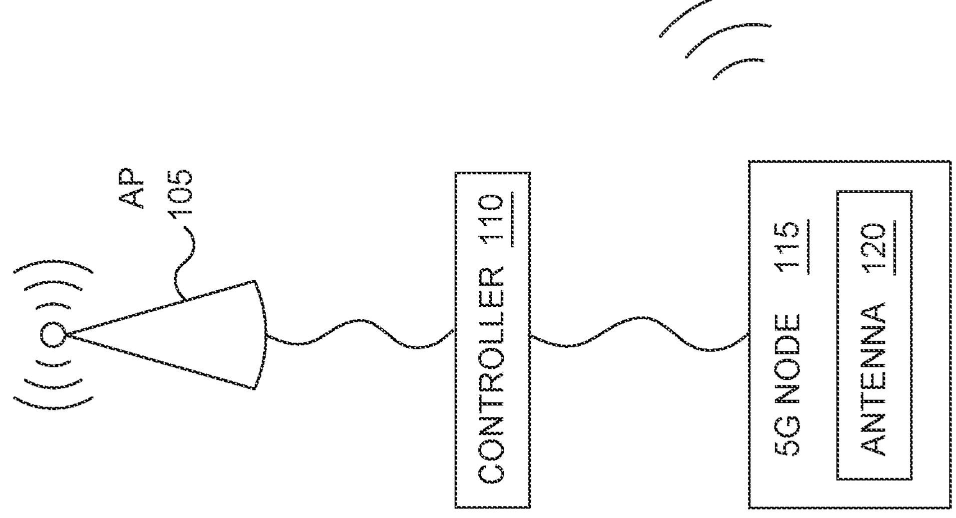

FIG. 1 illustrates a deployment 100 with a Wi-Fi AP 105 and a 5G node 115, according to one embodiment. In addition to the AP 105 and the 5G node 115, the deployment 100 includes a controller 110 and an AMP STA 150. The controller 110 serves as an intermediary between the AP 105 (e.g., a Wi-Fi network) and the 5G node 115 (e.g., a 5G network). As discussed in more detail below, the controller 110 can instruct the 5G node 115 to provide additional power for the AMP STA 150 so the STA 150 can transmit data to the AP 105. That is, a 5G network is used to provide power to Wi-Fi devices (e.g., the AMP STA 150).

The 5G node 115 (e.g., gNBs) includes an antenna 120 that can transmit radio frequency (RF) signals to the AMP STA 150. Typically, 5G networks have reduced restrictions on transmit power than Wi-Fi networks. For example, government regulations may permit 5G nodes 115 to transmit higher power RF signals than the Wi-Fi devices (e.g., the AP 105). As such, where the distance or interference between the AP 105 and the AMP STA 150 prevents the AP 105 from providing sufficient wireless power to the AMP STA 150, the controller 110 can provide instructions to the 5G node 115 to use its antenna to wirelessly transmit power to the AMP STA 150. The instructions from the controller 110 can indicate the power level used by the antenna 120, the frequency of the transmissions to the AMP STA 150, and a direction of the transmissions.

In one embodiment, the controller 110 is a software application. The controller 110 may be executed in the AP 105 (or some other AP in the Wi-Fi network). In another example, the controller 110 may be executed in another device, such as a wireless local area network (LAN) controller (WLC). In one embodiment, the controller 110 performs MAPc, but is not limited to such. MAPc, which is currently being developed for Wi-Fi 8, aims to improve the overall network performance by allowing APs to share time, frequency, and/or spatial resources in a coordinated way, thus alleviating inter-AP contention and enabling new multi-AP channel access strategies.

The AMP STA 150 includes a transmitter 155, an energy storage component 160, and an antenna 165. The transmitter 155 transmits Wi-Fi signals to the AP 105. The energy storage component 160 can be a capacitor for storing power from wireless RF signals received using the antenna 165 on the AMP STA 150. Thus, the AMP STA 150 is an active AMP STA 150 that can store received wireless power. However, in another embodiment, the AMP STA 150 may be a passive AMP STA 150 in which case it would not have the energy storage component 160.

In one embodiment, the AMP STA 150 stores power in the energy storage component 160. Once a threshold is reached, the transmitter 155 transmits a Wi-Fi signal using the antenna 165. The Wi-Fi signal can include data packets, frames, and the like. In one example, the AMP STA 150 includes other components such as sensors that gather information about the environment, such as an IoT sensor. The data captured by the sensor can be transmitted to the AP 105 using the Wi-Fi signal.

There are several scenarios where the AMP STA 150 may not receive sufficient power from the AP 105. For example, the AMP STA 150 may be programmed to transmit sensor data to the AP 105 at a set interval, but the power received from the AP 105 may not be sufficient (due to distance or interference) to transmit frequently enough to satisfy the interval. In another example, the AMP STA 150 may be a passive AMP STA that backscatters the signals received from the AP 105. But the backscattered (e.g., reflected) signals may not reach the AP 105. For example, a relay device (e.g., another Wi-Fi device such as a user device) may receive the signals from the AMP STA 150 and relay them to the AP 105. But to improve reliability, it may be optimal for the AMP STA 150 to be able to directly communicate to the AP 105 without having to rely on a relay device.

The embodiments below discuss techniques for identifying when an AMP STA 150 is not receiving sufficient power, and instructing the 5G node 115 to provide supplemental power to the AMP STA 150 so it can more effectively communicate with the AP 105.

Figure 2:
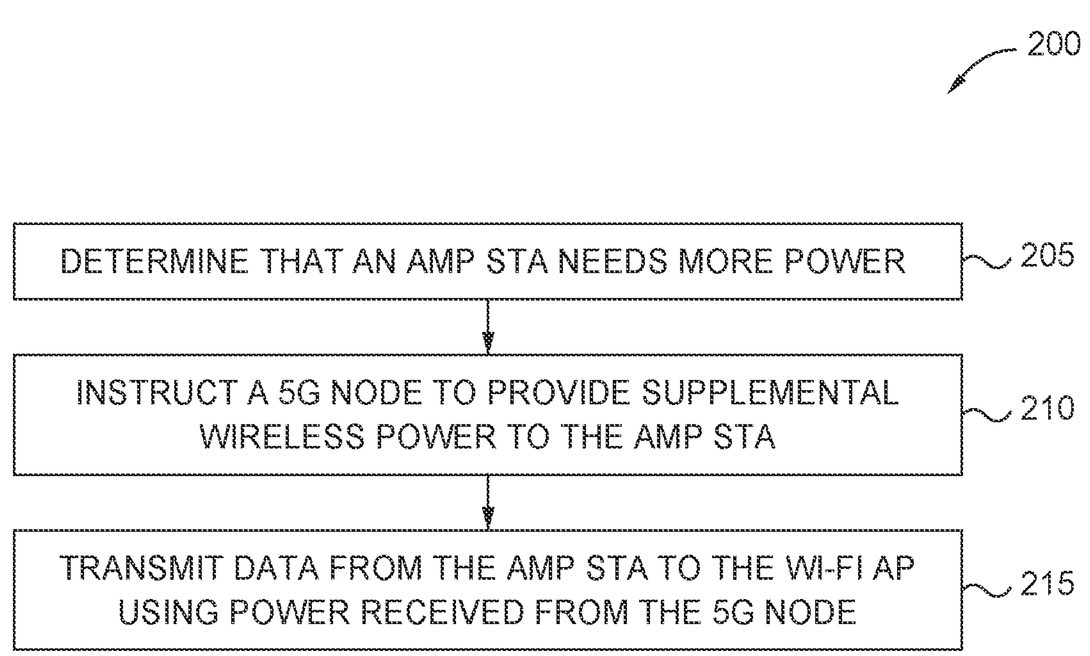
FIG. 2 is flowchart for using a 5G node to provide supplemental power to a AMP STA for Wi-Fi communication, according to one embodiment.

FIG. 2 is flowchart of a method 200 for using a 5G node to provide supplemental power to a AMP STA for Wi-Fi communication, according to one embodiment. The method 200 can be used with active AMP STAs and passive AMP STAs.

At block 205, a controller (or an AP) determines that an AMP STA needs more power than currently receiving. In one example, the AMP STA may be able to communicate with the AP (e.g., send a transmission every ten minutes) but not with a desired frequency (e.g., send a transmission every minute). In another example, the AMP STA may not be able to communicate with the AP at all. Instead, a relay (or buddy) device may be used to receive and relay signals received from the AMP STA to the AP, which may not be preferred.

In one embodiment, when an AMP STA joins a Wi-Fi network, the AMP STA tells the AP how much energy the STA needs in order to transmit and how often the STA wants to transmit. As such, the AP (or controller) can monitor to see if the AMP STA is getting sufficient power to transmit with the desired frequency. In one embodiment, the AMP STA may report to the AP the amount of power it received (e.g., the amount of power received over time), or the controller may determine or estimate the rate at which the AMP STA receives power based on how often the AMP STA is able to send transmissions to the AP.

At block 210, the controller instructs a 5G node to provide supplemental wireless power to the AMP STA. In one embodiment, the controller provides a power level for the 5G node to use. The power level can be based on the controller determining how much power the AMP STA is already receiving from the AP. That is, the controller can estimate or determine how much power the AMP STA already receives from the AP (or multiple APs), and then determine how much the 5G node should deliver to the AMP STA so that the STA is powered sufficiently to perform its desired operations. For example, the controller can determine that the AP or APs in the Wi-Fi network provide 60% of the power needed by the AMP STA so it can transmit data at a desired frequency. The controller can then select a power level for the 5G node that delivers 40% of the desired power to the AMP STA.

By setting a power level, the controller can ensure the AMP STA gets the required power, but does not get more power than it needs. This can prevent waste and unnecessary interference. That is, if the 5G node transmitted power at its maximum level, this might be more power than the AMP STA needs to transmit at its desired frequency, which means power is unnecessarily used in the 5G node, and may cause unnecessary interference if the 5G signals reach additional devices.

In one embodiment, the controller determines a schedule or a frequency at which the 5G node transmits signals to the AMP STA. For example, the 5G node can transmit more power to the AMP STA if it transmits RF signals to the AMP STA more frequently. Thus, the amount of power the 5G node transmits can depend on the power level and the frequency at which the 5G node transmits 5G signals to the AMP STA.

In one embodiment, the controller can inform the 5G node of a direction towards the AMP STA. For example, the AMP STA may be stationary, in which case, assuming the controller knows the location of the AMP STA, the controller can provide the location or a direction to the AMP STA to the 5G node. Doing so enables the 5G node to direct its wireless signals towards the AMP STA which can provide more power to the AMP STA and reduce interference on other wireless devices.

Notably, the frequency used by the 5G node to wirelessly transmit power to the AMP STA may be different from a Wi-Fi frequency used by the AMP STA to transmit data to the AP. Stated differently, the AMP STA can harvest power using a frequency different from one the AMP STA uses to transmit data. For active AMP STAs, the controller may be able to choose any suitable frequency for the 5G node to transmit power to the STA. That is, because the AMP STA is harvesting and storing the energy received from the 5G node, the specific frequency used by the 5G node is unrelated to the frequency used by the AMP STA to transmit data. However, for passive AMP STAs, the controller may set an offset between the frequency used by the 5G node and the frequency used by the AMP STA. For example, the AMP STA may include multiple filters (or programmable filters) so when receiving wireless signals at a first frequency, it backscatters or reflects signals at a second frequency, where the first and second frequencies are separated by an offset. This is discussed in more detail in FIG. 4.

At block 215, the AMP STA transmits wireless data to the Wi-Fi AP using power received from the 5G node. In one embodiment, this power is stored in a power storage component in the case of an active AMP STA. In another embodiment, the power is not stored but is rather backscattered or reflected by a passive AMP STA. In either case, the method 200 permits 5G signals to provide power to an AMP STA to transmit Wi-Fi signals.

Figure 3:
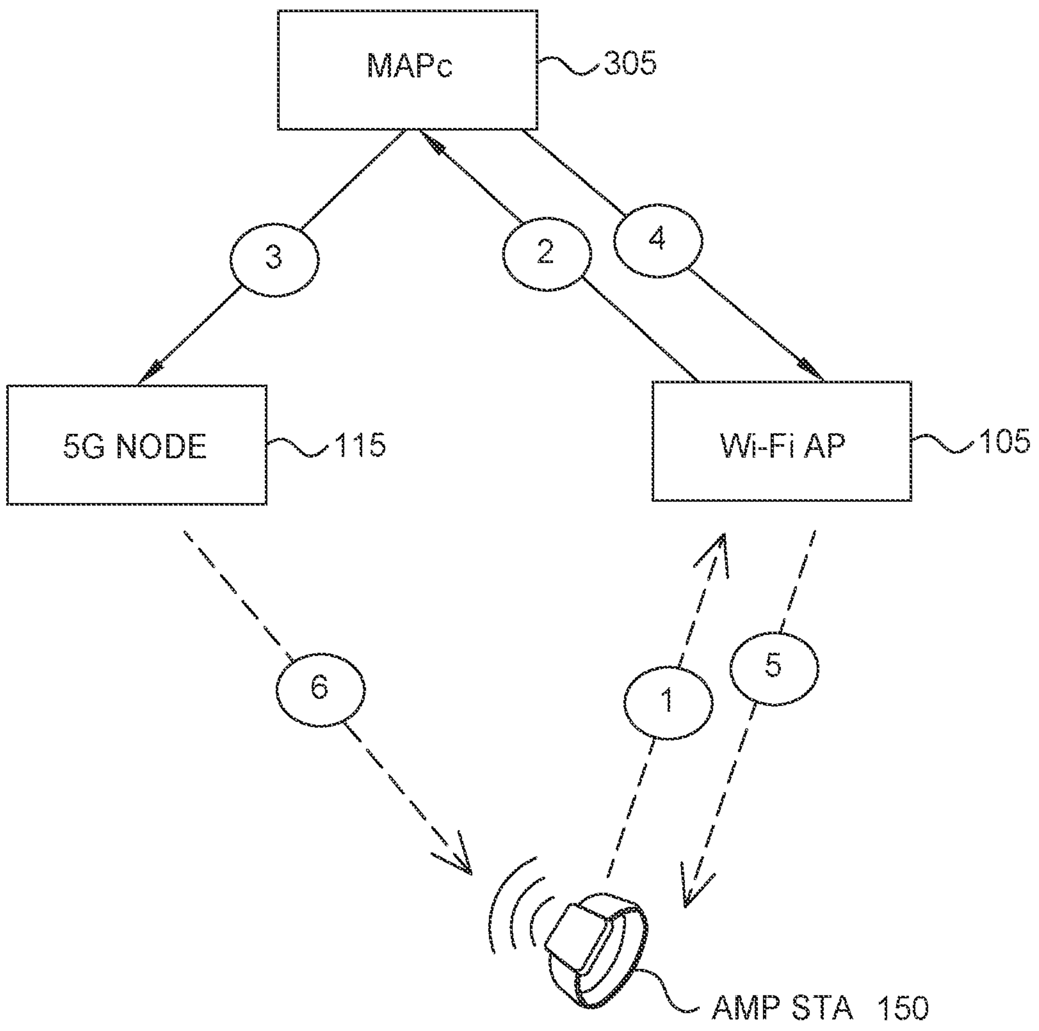
FIG. 3 illustrates using multi-access point coordination to communicate with a 5G node, according to one embodiment.

FIG. 3 illustrates using MAPc 305 to communicate with a 5G node 115, according to one embodiment. That is, FIG. 3 illustrates communication between the AP 105, MAPc 305, and the 5G node 115. While shown as being separate from the AP 105, in one embodiment, MAPc 305 may performed by the AP 105. For example, MAPc 305 may be a software application that executes on the AP 105, or some other device—e.g., a WLC.

MAPc 305 can instruct the 5G node 115 when to transmit supplemental power to the AMP STA 150. The MAPc 305 can communicate with the 5G using a wired or wireless communication.

FIG. 3 also illustrates, using slashed lines, the 5G node, AMP STA 150, and the Wi-Fi AP 105 exchanging wireless RF signals. These wireless signals can include data or can be transmitted solely for transmitting power. For example, in one embodiment, the RF signals transmitted from the 5G node 115 to the AMP STA 150 may be used only to provide power so that the AMP STA 150 can transmit data to the AP 105. Similarly, in one embodiment, the AP 105 may not transmit data to the AMP STA 150, but transmits wireless signals only to provide power to the AMP STA 150. However, in other embodiments, the RF signals transmitted by the 5G node 115 and the AP 105 to the AMP STA 150 may include data that is decoded and used by the AMP STA 150.

Figure 4:
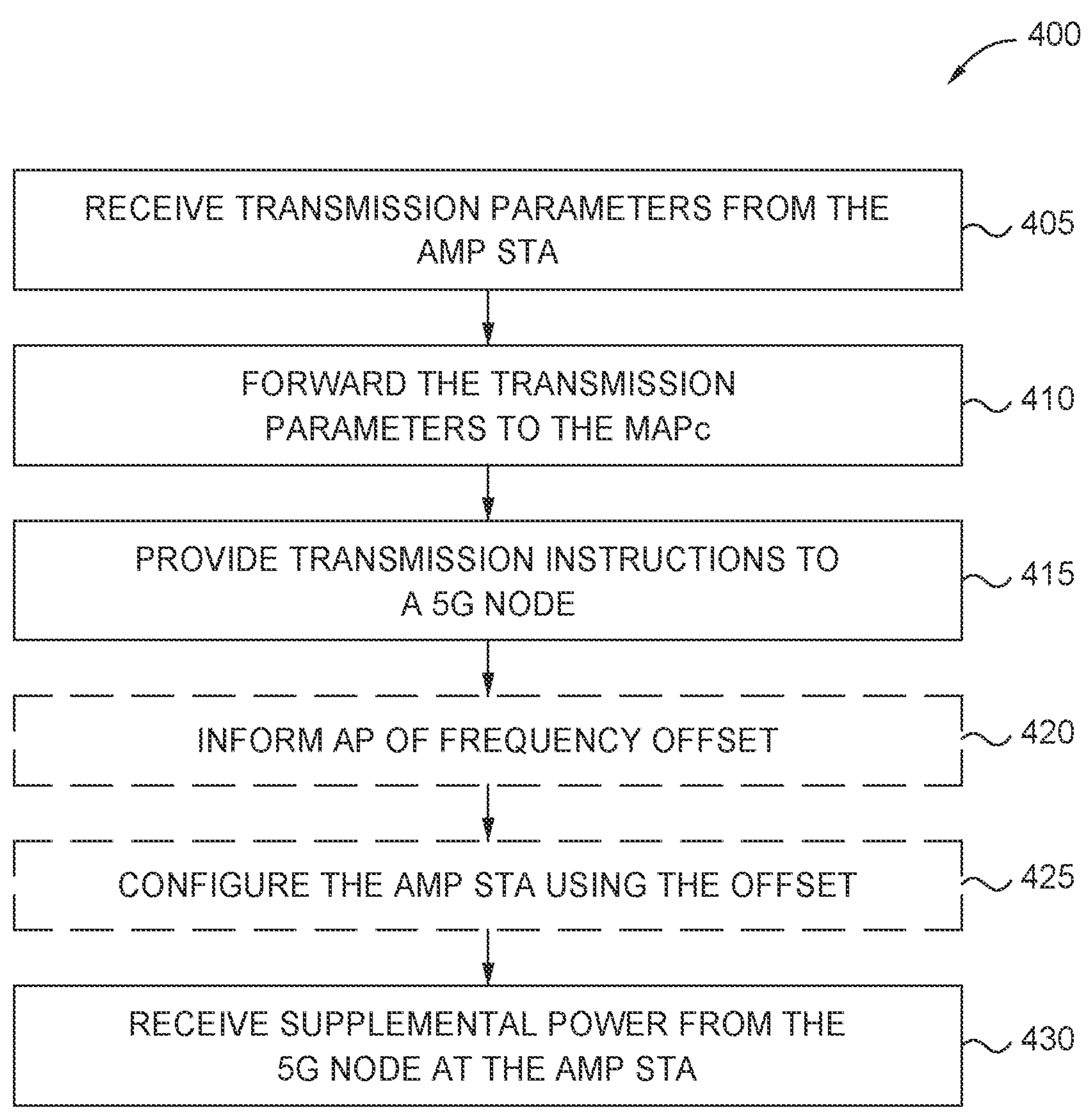
FIG. 4 is flowchart for using a 5G node to provide supplemental power to a AMP STA for Wi-Fi communication, according to one embodiment.

The numbered lines in FIG. 3 are discussed in detail in FIG. 4.

FIG. 4 is flowchart of a method 400 for using a 5G node to provide supplemental power to a AMP STA for Wi-Fi communication, according to one embodiment. At block 405 (Line 1), the AP 105 receives transmission parameters from the AMP STA. The transmission parameters can include parameters informing the AP how the AMP STA desires to transmit data. These parameters (e.g., backscattering requirements) can include a schedule indicating when the AMP STA transmits data to the AP, a frequency at which the AMP STA transmits data to the AP, and so forth. The parameters can also include an amount of power the STA needs before transmitting, assuming the STA is an active AMP STA.

In one embodiment, the Wi-Fi AP 105 checks the schedules requested by multiple AMP STAs. The AP can determine a location of the AMP STAs, to determine which STAs may be further away from the AP 105, and thus, receive less power from the AP 105. In addition, the AP can determine whether there are nearby Wi-Fi devices (e.g., user devices) that can act as uplink (UL) relays. Based on these factors, the AP may determine whether it will be able to provide sufficient power to the AMP STA.

At block 410 (Line 2), the AP forwards the transmission parameters to MAPc 305. In one embodiment, the AP forwards the transmission parameters after determining it is (or will be) unable to provide sufficient power to the AMP STA. However, in another embodiment, the AP may always forward received transmission parameters to the MAPc 305 so the MAPc 305 can determine whether the AP 105 can provide sufficient power to the AMP STA 150.

At block 415 (Line 3), MAPc 305 provides transmission instructions to the 5G node (e.g., gNBs). In one embodiment, MAPc 305 exchanges the transmission parameters with the 5G node 115 and obtains the 5G node's transmission schedule (e.g., paging messages, control signaling such as Downlink Control Information (DCI)) and frequency ranges.

MAPc 305 can instruct the power level the 5G node uses to transmit RF signals to the AMP STA 150, the frequency of the signals, and a schedule indicating how often the 5G node should transmit the signals to the AMP STA 150. MAPc 305 can also indicate a direction of the signals so they more effectively reach the AMP STA 150.

As mentioned above, power levels of each message can be adjusted (e.g., increased) and better controlled in 5G compared to Wi-Fi. Thus, the method 400 provides a better way for energy harvesting than simply relying on Wi-Fi energy.

At block 420 (Line 4), MAPc 305 informs the AP 105 of a frequency offset. Block 420 is shown as a dashed line because it may be used only if the AMP STA is passive and relies on backscattering/reflecting the signals received from the AP 105 and the 5G node 115. The offset can define the difference between the frequency of the signals received by the AMP STA 150 and the frequency of the signals transmitted by the AMP STA 150. Thus, MAPc 305 may set the frequency used by the 5G node so that when the offset is applied, the AMP STA 150 transmits a Wi-Fi signal in a desired frequency (e.g., a frequency used by Wi-Fi).

In contrast, with active AMP STAs, block 420 may be skipped since there does not need to be a known offset between the frequency at which the AMP STAs receives signals and the frequency at which the AMP STAs transmits signals. Because an active AMP STA harvests power and stores it in an energy storage component, the AMP STA can receive power using any suitable frequency and then use the power stored in its energy storage component to transmit at any suitable frequency.

At block 425, the AP configures the AMP STA using the offset. Block 425 is shown as a dashed line because it may be used only if the AMP STA is passive and relies on backscattering/reflecting the signals received from the AP 105 and the 5G node 115. For example, MAPc can tell the AP the frequency of the signals the 5G node is going to transmit to the AMP STA and the offset the AMP STA should add to the frequency so the STA transmits at a desired Wi-Fi frequency. At block 425, the AP can configure the AMP STA to provide the desired offset.

In one example, the AMP STA may have different filters (or a programmable filter) that can be used to provide different offsets. For example, one filter (or filter setting) in the AMP STA may result in a first offset, a second filter (or second filter setting) may result in a second offset, and so forth. The AP can select the filter or filter setting that provides the desired offset so that the AMP STA receives signals from the 5G node (and the AP) at one frequency but immediately backscatters or reflects signals at a second frequency that is received by the AP 105. Put differently, the filter applies the offset on the received signals so that the backscatter or reflected signals are at a desired frequency used by the AP 105 to receive signals.

In one embodiment, upon receiving a frequency offset frame from the AP, the AMP STA sets its filter to a matching table value of the 5G radio and associated response frequency. The offset value in the AP frame may be represented with a specific payload, or by sending the frame with a specific structure.

At block 430 (Line 6), the AMP STA receives supplemental power from the 5G node. That is, 5G radio waves are then used by the AMP STA for energy harvesting or backscattering of energy.

In one embodiment, an active AMP STA can receive power from the AP at the same time (or at different time periods) it receives power from the 5G node. For example, at Time A, the 5G node may transmit power to the AMP STA which is harvested and stored while at Time B, the 5G node does not transmit and the AP transmits power to the AMP STA which is harvested and stored. Alternatively, the 5G node and AP may transmit RF signals in parallel to the AMP STA which are harvested and stored.

In one embodiment, a passive AMP STA can backscatter or reflect signals received from both the 5G node and the AP in parallel. That is, in parallel, the AMP STA can filter and reflect signals received from both the 5G node and the AP to transmit a modulated signal to the AP.

Further, in one embodiment, MAPc 305 triggers gNB coordination to boost the signal if the AMP STA 150 is located at the cell borders. In that case, MAPc can use multiple 5G nodes to provide supplemental power to the AMP STA 150. These 5G nodes could transmit power to the AMP STA in parallel, or at non-overlapping intervals.

Figure 5:
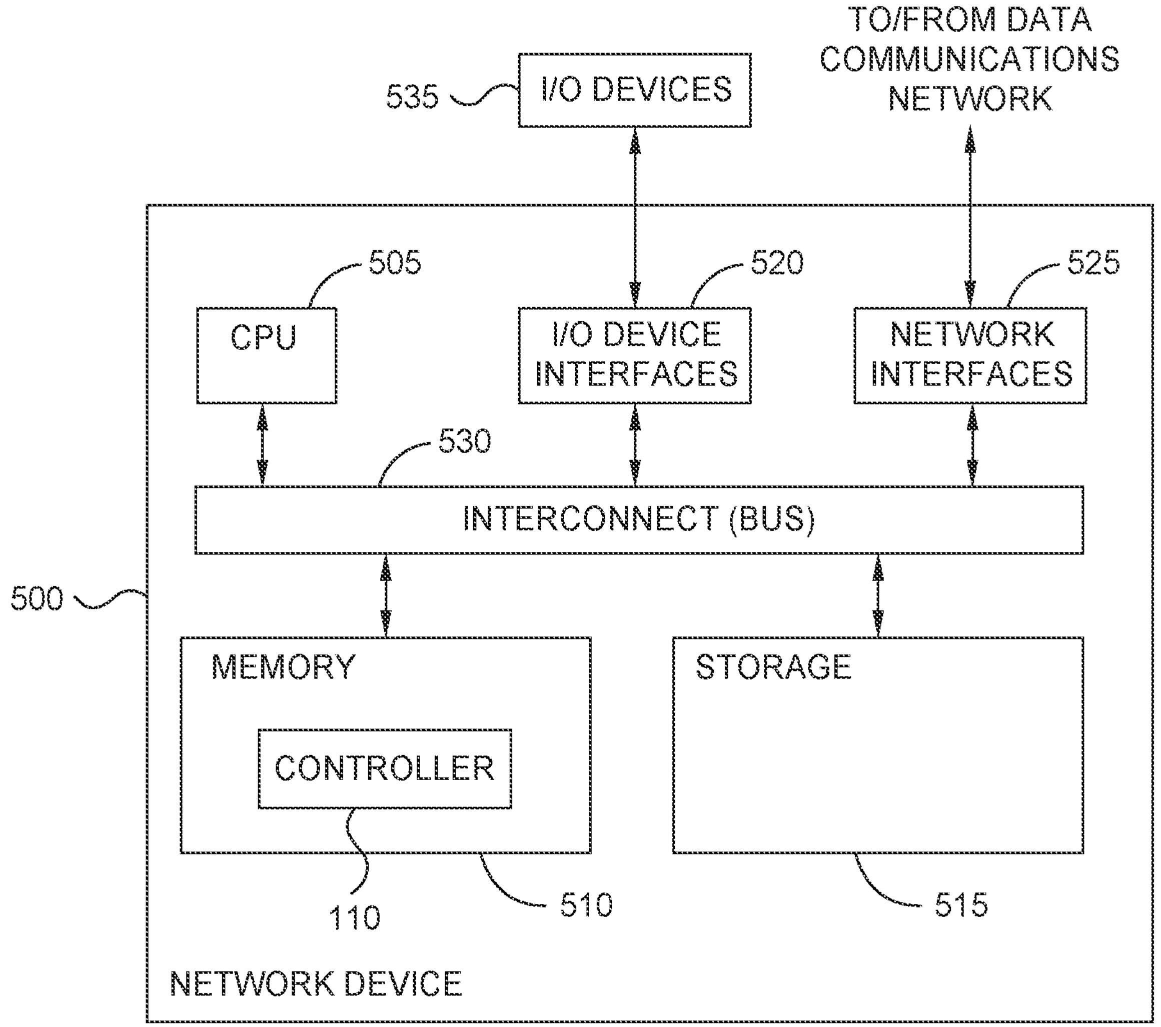
FIG. 5 depicts an example computing device configured to perform various aspects of the present disclosure, according to one embodiment.

FIG. 5 depicts an example computing device (e.g., a network device 500) configured to perform various aspects of the present disclosure, according to some embodiments of the present disclosure. In some embodiments, the network device 500 corresponds to an AP 105 of FIG. 1. Although depicted as a physical device, in embodiments, the network device 500 may be implemented using virtual device(s), and/or across a number of devices (e.g., in a cloud environment).

As illustrated, the network device 500 includes a CPU 505, memory 510, storage 515, a network interface 525, and one or more I/O interfaces 520. In the illustrated embodiment, the CPU 505 (e.g., one or more processors) retrieves and executes programming instructions stored in memory 510, as well as stores and retrieves application data residing in storage 515. The CPU 505 is generally representative of a single CPU and/or GPU, multiple CPUs and/or GPUs, a single CPU and/or GPU having multiple processing cores, and the like. The memory 510 is generally included to be representative of a random access memory. Storage 515 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 535 (such as keyboards, monitors, etc.) are connected via the I/O interface(s) 520. Further, via the network interface 525, the network device 500 can be communicatively coupled with one or more other devices and components (e.g., via a network, which may include the Internet, local network(s), and the like). As illustrated, the CPU 505, memory 510, storage 515, network interface(s) 525, and I/O interface(s) 520 are communicatively coupled by one or more buses 530.

In the illustrated embodiment, the memory 510 includes the controller 110 (or MAPc 305), which may perform one or more embodiments discussed above in FIGS. 1-4. Although depicted as discrete components for conceptual clarity, in embodiments, the operations of the depicted components (and others not illustrated) may be combined or distributed across any number of components. Further, although depicted as software residing in memory 510, in embodiments, the operations of the depicted components (and others not illustrated) may be implemented using hardware, software, or a combination of hardware and software.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a non-transitory computer readable storage medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A system, comprising:

an ambient station (AMP STA) configured to use a received radio frequency (RF) signal to transmit a Wi-Fi signal;

a Wi-Fi access point (AP) configured to communicate with the AMP STA;

a controller, wherein the AP is configured to inform the controller that the AMP STA requires more power than currently receiving to transmit the Wi-Fi signal to the AP; and a 5G node configured to transmit an RF signal to the AMP STA, wherein the AMP STA is configured to use power generated by the RF signal received from the 5G node to transmit the Wi-Fi signal to the AP, wherein, in response to determining that the AMP STA requires more power, the controller is configured to instruct the 5G node to transmit the RF signal to the AMP STA.

2. The system of claim 1, wherein the controller indicates to the 5G node a power at which to transmit the RF signal to the AMP STA and a schedule for transmitting the RF signal.

3. The system of claim 1, wherein the AMP STA is a device that comprises an energy storage component for storing power from RF signals received from the AP and the 5G node.

4. The system of claim 2, wherein the AMP STA is configured to use the energy storage component to transmit the Wi-Fi signal to the AP according to a schedule.

5. The system of claim 1, wherein the AMP STA is a passive backscattering device that does not include an energy storage component for storing power.

6. The system of claim 5, wherein the AMP STA is configured to use the power in the RF signal received from the 5G node to immediately backscatter the Wi-Fi signal to the AP, wherein the RF signal from the 5G node is at a frequency offset from the Wi-Fi signal.

7. An access point (AP), comprising:

one or more processors; and memory storing an application, which, when executed by the one or more processors performs an operation comprising:

determining that an ambient station (AMP STA) needs additional power when communicating with the AP, wherein the AMP STA is configured to use received RF signals to transmit a Wi-Fi signal to the AP, and instructing a 5G node to provide supplemental wireless power to the AMP STA.

8. The AP of claim 7, the operation comprising:

indicating to the 5G node a power at which to transmit an RF signal to the AMP STA and a schedule for transmitting the RF signal.

9. The AP of claim 7, wherein the AMP STA is a device that comprises an energy storage component for storing power from RF signals received from the AP and the 5G node.

10. The AP of claim 9, wherein the AMP STA is configured to use the energy storage component to transmit the Wi-Fi signal to the AP according to a schedule.

11. The AP of claim 7, wherein the AMP STA is a passive backscattering device that does not include an energy storage component for storing power.

12. The AP of claim 11, wherein the AMP STA is configured to use the power in the RF signal received from the 5G node to immediately backscatter the Wi-Fi signal to the AP, wherein the RF signal from the 5G node is at a frequency offset from the Wi-Fi signal.

13. The AP of claim 7, wherein instructing the 5G node to provide supplemental wireless power to the AMP STA comprises:

providing a power level at which the 5G node should transmit the RF signal based on an amount of power the AMP STA receives from the AP.

14. A non-transitory computer readable storage medium comprising computer readable program code embodied therewith, the computer readable program code executable by one or more computer processors to perform an operation, the operation comprising:

determining that an ambient station (AMP STA) needs additional power when communicating with an AP, wherein the AMP STA is configured to use received RF signals to transmit a Wi-Fi signal to the AP, and instructing a 5G node to provide supplemental wireless power to the AMP STA.

15. The non-transitory computer readable storage medium of claim 14, the operation comprising:

indicating to the 5G node a power at which to transmit an RF signal to the AMP STA and a schedule for transmitting the RF signal.

16. The non-transitory computer readable storage medium of claim 14, wherein the AMP STA is a device that comprises an energy storage component for storing power from RF signals received from the AP and the 5G node.

17. The non-transitory computer readable storage medium of claim 16, wherein the AMP STA is configured to use the energy storage component to transmit the Wi-Fi signal to the AP according to a schedule.

18. The non-transitory computer readable storage medium of claim 14, wherein the AMP STA is a passive backscattering device that does not include an energy storage component for storing power, wherein the AMP STA is configured to use the power in the RF signal received from the 5G node to immediately backscatter the Wi-Fi signal to the AP, wherein the RF signal from the 5G node is at a frequency offset from the Wi-Fi signal.

19. The non-transitory computer readable storage medium of claim 14, wherein instructing the 5G node to provide supplemental wireless power to the AMP STA comprises:

providing a power level at which the 5G node should transmit the RF signal based on an amount of power the AMP STA receives from the AP.

* * * * *